United States Patent
Watanabe

[11] 3,911,449
[45] Oct. 7, 1975

[54] SWITCH ARRANGEMENT FOR ELECTRONIC SHUTTER OF CAMERA

[75] Inventor: Koichiro Watanabe, Funabashi, Japan

[73] Assignee: Asahi Kogaku Kogyo Kabushiki Kaisha, Tokyo, Japan

[22] Filed: Sept. 17, 1973

[21] Appl. No.: 397,985

[30] Foreign Application Priority Data
Sept. 21, 1972  Japan.............................. 47-109949

[52] U.S. Cl................................. 354/50; 354/60 R
[51] Int. Cl.²......................................... G03B 7/08
[58] Field of Search........................ 354/51, 267, 50

[56] References Cited
UNITED STATES PATENTS
| | | | |
|---|---|---|---|
| 3,712,192 | 1/1973 | Ono et al. | 354/51 |
| 3,810,226 | 5/1974 | Ono et al. | 354/51 |

*Primary Examiner*—Samuel S. Matthews
*Assistant Examiner*—James LaBarre
*Attorney, Agent, or Firm*—Christie, Parker & Hale

[57] ABSTRACT

A switch arrangement reduces wasteful drain of current in energizing an electrically energizable magnet that initially holds and then releases a follower shutter curtain which runs behind a leading shutter curtain.

3 Claims, 7 Drawing Figures

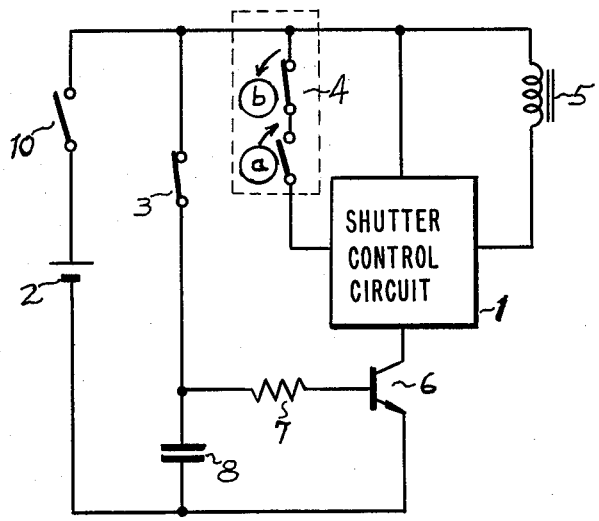
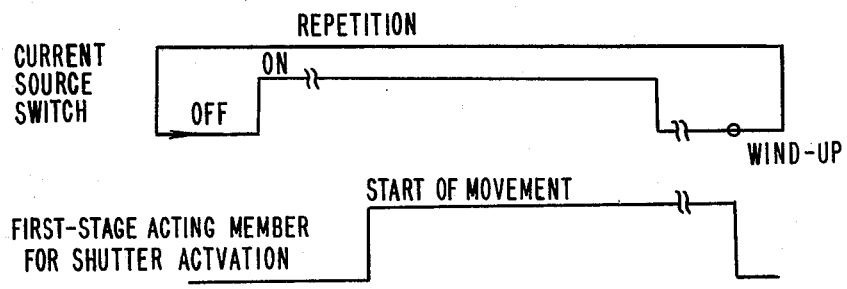
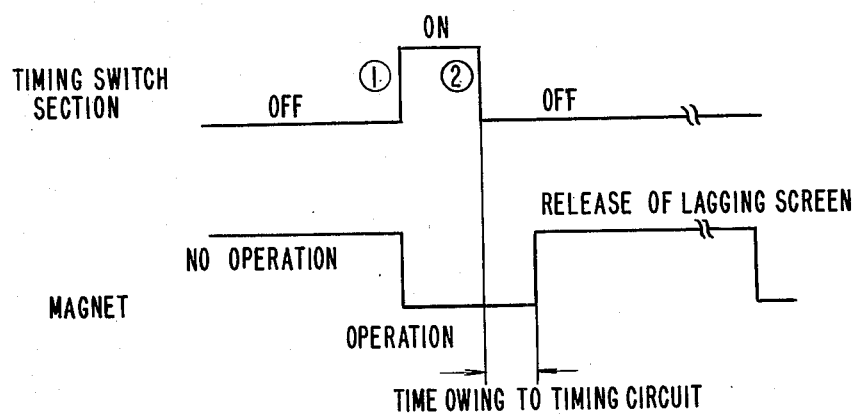

SWITCH ARRANGEMENT FOR ELECTRONIC SHUTTER OF CAMERA

BACKGROUND OF THE INVENTION

This invention relates to shutter mechanism control.

In a camera of the single lens reflex type there is generally provided a shutter mechanism having leading and follower shutter curtains.

In abandoned application Ser. No. 392,212 filed on Aug. 28, 1973 in the names of Hisao Amano and Hiroshi Kurei, entitled EXPOSURE-TIME CONTROL DEVICE, and assigned to the assignee of this invention, there is shown in FIG. 1 of that application a typical prior art arrangement for controlling the exposure-time of such a camera shutter mechanism. This copending application is hereby incorporated by reference herein.

Generally, in such an arrangement, there is provided a light measurement circuit, a computing circuit, and a timing circuit. A key function of the timing circuit is to control an electrically energizable magnet. The follower shutter curtain is held in a wound-up position so long as the magnet is energized. Upon de-energization, the follower shutter curtain is released so that it runs behind the leading shutter curtain.

A significant problem with prior art arrangements relates to waste incident to unnecessarily energizing the electrically energizable magnet. Thus, typically, during the full interval of time that the shutter is wound up, current is supplied to the magnet. In use, a photographer frequently winds up the shutter and then waits a relatively long time before he takes a picture. He, of course, has to take the time to compose a picture as he desires and sometimes has to wait for a subject to get ready for the picture. Accordingly, with a "demagnetization" type system there is the likelihood of a serious waste of current.

SUMMARY OF THE INVENTION

This invention is directed to overcome this problem of wasted current.

The combination of this invention is incorporated in a camera having an exposure-time control arrangement therein. The arrangement has leading and follower shutter curtains with the leading curtain being operative to run upon movement of first-stage acting members in the camera. Such first-stage acting members include the mirror which swings out of the way of the film prior to the opening of the shutter. An electrically energizable magnet provides for initially holding and then releasing the follower shutter curtain to run behind the leading shutter curtain. An important feature of the combination relates to a timing switch. Whereas in prior art approaches, timing switches are provided, in the past the timing switch has been operated in a closed position during the full interval of time between winding up of the shutter and an intermediate state of shutter mechanism operation. With the timing switch so closed, in the prior art arrangements, there has been a continuous drain of current through the magnet. In contrast, the timing switch in this invention has a normally disabled position, which is preferably an open-switch condition. The timing switch is in an opposite enabling position only for an interval of time commencing after the start of movement of the first-stage acting members. The combination further includes a shutter control circuit and a current supply circuit therefor. The shutter control circuit has an input connected to the timing switch and an output connected to the electrically energizable magnet. The shutter control circuit gates energization current, supplied through the supply circuit, to the magnet so as to hold the follower shutter curtain in place, but significantly does not start gating such current until the timing switch changes position to its enabling position.

In an advantageous arrangement, the current supply circuit includes a semiconductor switching circuit that performs a delay function, and, in doing so, eliminates any switch chattering from adversely affecting the magnet energizing operation.

BRIEF DESCRIPTION OF THE DRAWINGS

FIG. 1 is a block and schematic drawing showing the preferred embodiment of the invention;

FIG. 2 is a group of timing diagrams illustrating the operation of the embodiment of FIG. 1.

DETAILED DESCRIPTION

Figure 3:
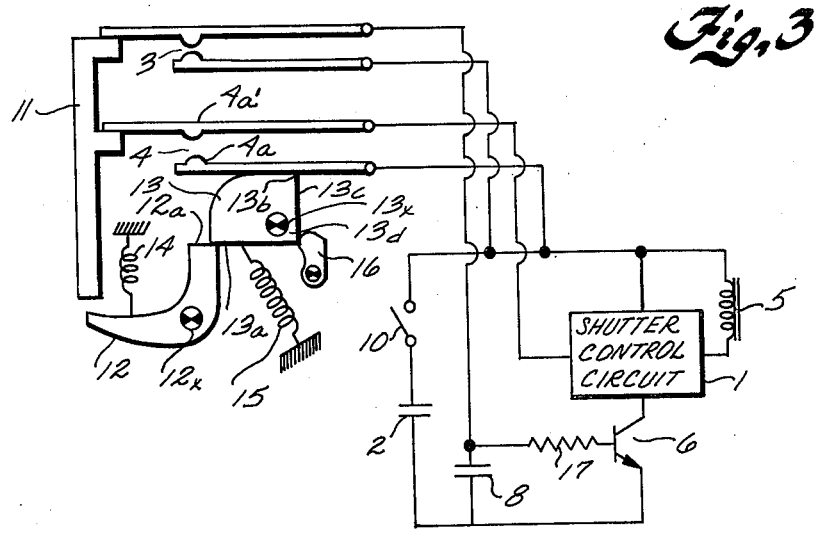
FIGS. 3–7 are sketches illustrating the relationship between conventional first-stage acting members of a camera and the circuitry of FIG. 1, with the consecutively numbered figures illustrating consecutive phases of operation of the mechanical portion.

FIG. 1 shows an electronic shutter control circuit 1 which is of the type containing light measurement and computing circuits. A switch 10, a current source 2 such as a battery, and a semiconductor switching element 6 such as a transistor together form a current supply circuit for the shutter control circuit. The semiconductor 6 together with a switch 3, a resistor 7, and a capacitor 8 form a switching circuit which performs a delaying function incident to the operation of the current supply circuit.

The shutter control circuit 1 has an input connected to a timing switch 4 and an output connected to an electrically energizable magnet 5. The shutter control circuit provides for gating energization current, supplied through the current supply circuit, to the magnet 5. In operation the shutter control circuit commences to gate the energization current in response to the timing switch 4 switching to the enabling position (i.e., closed in the preferred embodiment). Once it commences to gate this current it continues to do so until a lapse of a delay interval after the reopening of the timing switch. However, as long as the timing switch 4 is in a disabling position (i.e., open in the preferred embodiment), the shutter control circuit is disabled from commencing to gate such energization current.

The circuit operation will now be explained with reference to FIG. 2. When the shutter is cocked or wound up, the current source switch 10 closes. While the photographer is composing a picture and before he actuates the shutter release, the other switches 3 and 4 remain open. Since switch 3 is open at this time, there is no bias current provided to the semiconductor switching element 6 and it is in a non-conducting or OFF condition.

Upon shutter release, the first stage acting members in the mirror box begin to move. The switch 3 is mechanically arranged so that it closes in response. When the switch 3 is closed, the semiconductor element 6 becomes conductive so that current is supplied to the shutter control circuit 1 from the current source 2 through the previously closed current source switch 10. The timing switch 4 is similarly mechanically arranged, and when it closes in response to movement of the members, it enables circuit 1 to gate energization current to the magnet 5. Being energized, the magnet 5 holds the follower shutter curtain or screen while the first-stage acting members continue to move and lead to movement of the leading shutter curtain or screen.

The timing switch 4 is reopened in one of the conventional manners, either responsive to a driving connection with the action of the first-stage acting members or the shutter leading curtain. Opening of the timing switch starts the timing or delay action of the circuit 1. Thus, after lapse of a predetermined time, current supply to the electromagnet is stopped so that the follower curtain runs and the current source switch 10 is opened.

Accordingly, during the light measurement the timing switch 4 is open so that no current supply is wasted by energizing the electromagnet 5 and only light measurement operation is made. When the film is again wound up, the current source switch 10 is closed in driving connection with this wind-up action so that the camera system is placed in the initial state. From the aforementioned fact, the same result is obtained whether the timing switch 4 operates as a single switch, or it operates with the structure of plural timing switch sections 4a and 4b with time sequence.

As for the timing switch 4, generally it is only the switch 4a, and as for the switch 4b it is normally conductive. When the switch 4b is in closed condition, closure of said actuating switch 3 causes current to be supplied not only to the light measurement circuit but also to the electromagnet 5. Operation of the timing switch 4 with the time sequence as shown in FIG. 2, waste of current supply to the electromagnet 5 is prevented, and the structure of the timing switch 4 with a single switch prevents lowering of reliability owing to addition of switches. As to such an embodiment in which a single switch is used for performing the function of the timing switch 4, consider FIGS. 3–7.

In addition to a circuit arrangement according to this invention FIG. 3 shows a mechanical arranngement of well known construction. This includes a shutter release means 11, a shutter locking member 12, and a member 13.

The shutter locking member 12 takes the form of a bellcrank which pivots about an axis 12x. A compression spring 14, which is connected to one arm of the shutter locking member, biases it toward counterclockwise rotation. The other arm of the shutter locking member abuts the member 13 during the phases of operation depicted in FIGS. 3 and 4. A tension spring 15 is connected to the member 13 and biases it toward counterclockwise rotation about its axis of rotation 13x. At the phase of operation depicted in FIG. 3, the members 12 and 13 are locked, the switches 3 and 4 are open, and a shutter leading screen locking member 16 is in a locking position.

Figure 4:
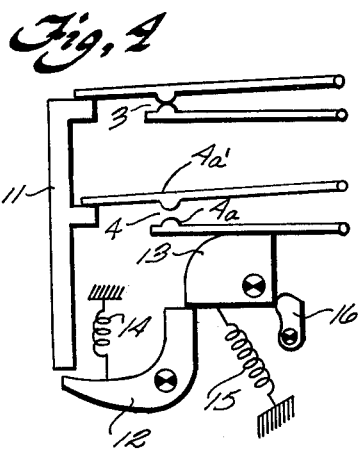

At the phase of operation depicted in FIG. 4, the shutter control circuit 1 is receiving power through closed switch 10. Also, the switch 3 has closed as a result of the shutter release means 11 having been depressed. The switch 4, however, remains open, and accordingly, the magnet 5 is not yet energized. With reference to the timing diagrams of FIG. 2, at this phase of operation, the current source switch is ON, and the first-stage acting member has not yet started its movement.

Figure 5:
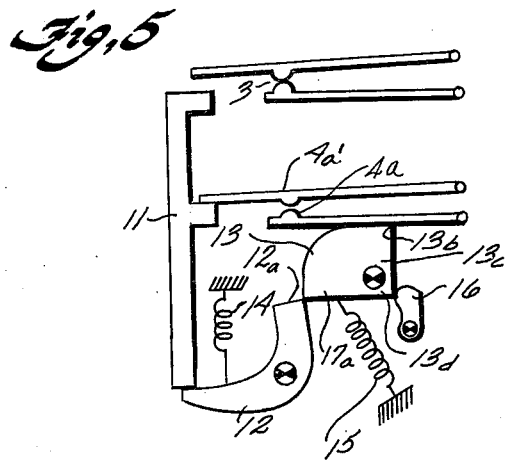

When the shutter release means 11 is further depressed to the point illustrated in FIG. 5, it engages an arm of the shutter locking member 12 such that it torques the member 12 counterclockwise. As a result, the other arm of the member 12 swings out of the way of the member 13. As a result of being so released, the member 13 will respond to the biasing of the spring 15 and rotate counterclockwise. Until it does so, however, the switch 4 remains open. With reference to the timing diagrams of FIG. 2, at this phase of operation, the current source switch is ON and the first-stage acting member has started its movement.

Figure 6:
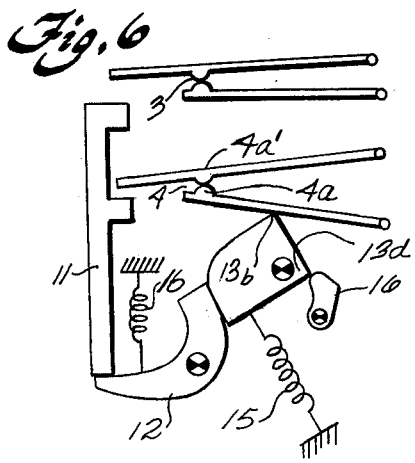

In the next phase, as depicted in FIG. 6, the rotation of the released member 13 causes a portion of 3b thereof to force the switch 4 closed. That is, a contact point 4a of the switch 4 is pushed up into electrical connection with a contact point 4a'. With reference to the timing diagrams of FIG. 2, at this phase of operation, the timing switch section has been turned ON.

Figure 7:
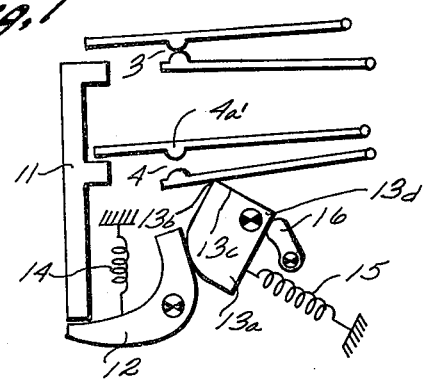

The member 13 continues to rotate, and then the contact point 4a begins to return to its original position thus opening the switch 4. As depicted in FIG. 7, at this phase of operation, a portion 13c of the member 13 abuts the switch arm carrying contact point 4a. The member 13 is connected to the shutter leading screen (not shown). A shutter leading screen locking member 16 is affected by the rotation of the member 13. Also, a spring not shown biases the member 16 toward counterclockwise rotation. Between the phases of operation illustrated in FIGS. 6 and 7, a corner portion 13d of the member 13 moves sufficiently as to release the member 16. Thereupon the leading screen starts to run. As to the trailing screen, it is released when the magnet 5 is de-energized a predetermined period of time after the opening of the switch 4.

In the arrangement according to the present invention, there is no undesirable influence owing to the chattering of the additional actuating switch 3. For example, the actuating switch 3 may be replaced by a semiconductor element 6 or be connected in series with the semiconductor element 6, but such arrangement of the switch 3 is liable to produce the influence of chattering, or it would necessitate an entire alteration of circuit structure. Now, in the arrangement according to the present invention, the switch 3 actuates a semiconductor switching circuit having delay function, so that however much chattering the switch 3 may produce, the first closure of the switch 3 has made said circuit conductive. Therefore there is no undesirable influence exerted on the action of the shutter control circuit 1, and as for the electromagnet 5, the delay time of the semiconductor switching circuit for retaining current supply time starts at the time of chattering.

What is claimed is:

1. In a camera having a releasable shutter mechanism, first-stage acting members that move in an initial stage of shutter release operation, an exposure-time control arrangement for controlling the shutter mechanism, the shutter mechanism having leading and follower shutter curtains with the leading curtain being operative to run upon movement of the first-stage acting members and having an electrically controllable magnet for initially holding and then releasing the follower shutter curtain to run behind the leading shutter curtain, the combination comprising:

a timing switch movable between first and second positions, the first position being a normally disabling position and the second position being an enabling position, the timing switch being coupled to the first-stage acting members so that upon the start of movement of the first-stage acting members the timing switch moves successively from its normally disabling position to its enabling position and then returns to its normally disabling position before the follower shutter curtain begins to run;

a shutter control circuit;

a controllable current supply circuit for the shutter control circuit;

switching means for controlling the current supply circuit so that it is operative to supply current after the first-stage acting members begin to move; and the shutter control circuit having an input connected to the timing switch and an output connected to the electrically energizable magnet to gate energization current supplied through the supply circuit to the magnet, said gating of energization current commencing immediately upon closing of the timing switch to the enabling position so that the follower curtain is initially held while the leading curtain is running, the shutter control circuit being disabled from commencing to gate such energization current while the timing switch is in its normally disabling position, thereby diminishing the drain of current.

2. The combination of claim 1 wherein the current supply circuit includes a semiconductor switching element having a delay function.

3. The combination of claim 1 wherein the switching means includes a normally open switch mechanically arranged so as to close in response to the first-stage acting members.

* * * * *